US012726338B2

(12) United States Patent
Kim et al.

(10) Patent No.: US 12,726,338 B2
(45) Date of Patent: Sep. 1, 2026

(54) ELECTRONIC DEVICE AND METHOD FOR PROVIDING SECRET MESSENGER FUNCTION THROUGH END-TO-END ENCRYPTION ON BASIS OF BLOCKCHAIN DID TECHNOLOGY

(71) Applicant: BLOCKCHAIN LABS INC., Seoul (KR)

(72) Inventors: Yong Tae Kim, Seoul (KR); Byung Wan Lim, Seoul (KR)

(73) Assignee: BLOCKCHAIN LABS INC., Seoul (KR)

( * ) Notice: Subject to any disclaimer, the term of this patent is extended or adjusted under 35 U.S.C. 154(b) by 42 days.

(21) Appl. No.: 19/104,055

(22) PCT Filed: Oct. 13, 2022

(86) PCT No.: PCT/KR2022/015505

§ 371 (c)(1),
(2) Date: Feb. 14, 2025

(87) PCT Pub. No.: WO2024/048838

PCT Pub. Date: Mar. 7, 2024

(65) Prior Publication Data

US 2026/0067067 A1 Mar. 5, 2026

(30) Foreign Application Priority Data

Aug. 30, 2022 (KR) ........................ 10-2022-0108948

(51) Int. Cl.

| | |
|---|---|
| ***H04L 9/08*** | (2006.01) |
| ***H04L 9/00*** | (2022.01) |
| ***H04L 9/32*** | (2006.01) |

(52) U.S. Cl.
CPC .......... *H04L 9/0825* (2013.01); *H04L 9/0861* (2013.01); *H04L 9/3247* (2013.01); *H04L 9/50* (2022.05)

(58) Field of Classification Search
CPC ... H04L 9/0825; H04L 9/0861; H04L 9/3247; H04L 9/50; H04L 9/00; H04L 9/08;
(Continued)

(56) References Cited

U.S. PATENT DOCUMENTS

2024/0414014 A1* 12/2024 Kim ...................... G06F 21/602
2025/0200553 A1* 6/2025 Kim ........................ G06F 21/34

FOREIGN PATENT DOCUMENTS

KR 102003272 B1 * 10/2019 ........... H04L 9/0825
KR 20220066823 A * 5/2022 ......... H04L 63/1483
KR 20220092748 A * 7/2022 ............. H04L 63/12

OTHER PUBLICATIONS

Singh, Raman et al. Blockchain-Enabled End-to-End Encryption for Instant Messaging Applications. arXiv:2104.08494v2. Jul. 30, 2021, pp. 1-6. (Year: 2021).*

* cited by examiner

*Primary Examiner* — Han Yang
(74) *Attorney, Agent, or Firm* — Studebaker Brackett PLLC

(57) ABSTRACT

The present disclosure related to a client device including a communication interface configured to communicate with an agency server and a counterpart device, a memory, and a processor. The processor may transmit a topic creation request to the agency server, when a topic creation notification is received from the agency server, generate a first subscription DID corresponding to the topic, a pair of first subscription private key and first subscription public key corresponding to the first subscription DID, transmit the first subscription DID to the counterpart device, receive a second
(Continued)

start
transmit topic creation request to agency server — 3010
receive topic creation notification from agency server — 3020
generate first subscription DID corresponding to topic — 3030
transmit first subscription DID to counterpart device — 3040
receive second subscription DID generated by counterpart device from agency server — 3050
generate first encryption key based on first subscription private key and second subscription DID — 3060
transmit message data encrypted with first encryption key to agency server — 3070
end subscription DID generated by the counterpart device from the agency server, generate a first encryption key based on the first subscription private key and the second subscription DID, and transmit message data encrypted with the first encryption key to the agency server.

13 Claims, 5 Drawing Sheets

(58) Field of Classification Search
CPC ......... H04L 9/3239; H04L 9/40; H04L 51/21; H04L 63/0428
See application file for complete search history.

FIG. 1

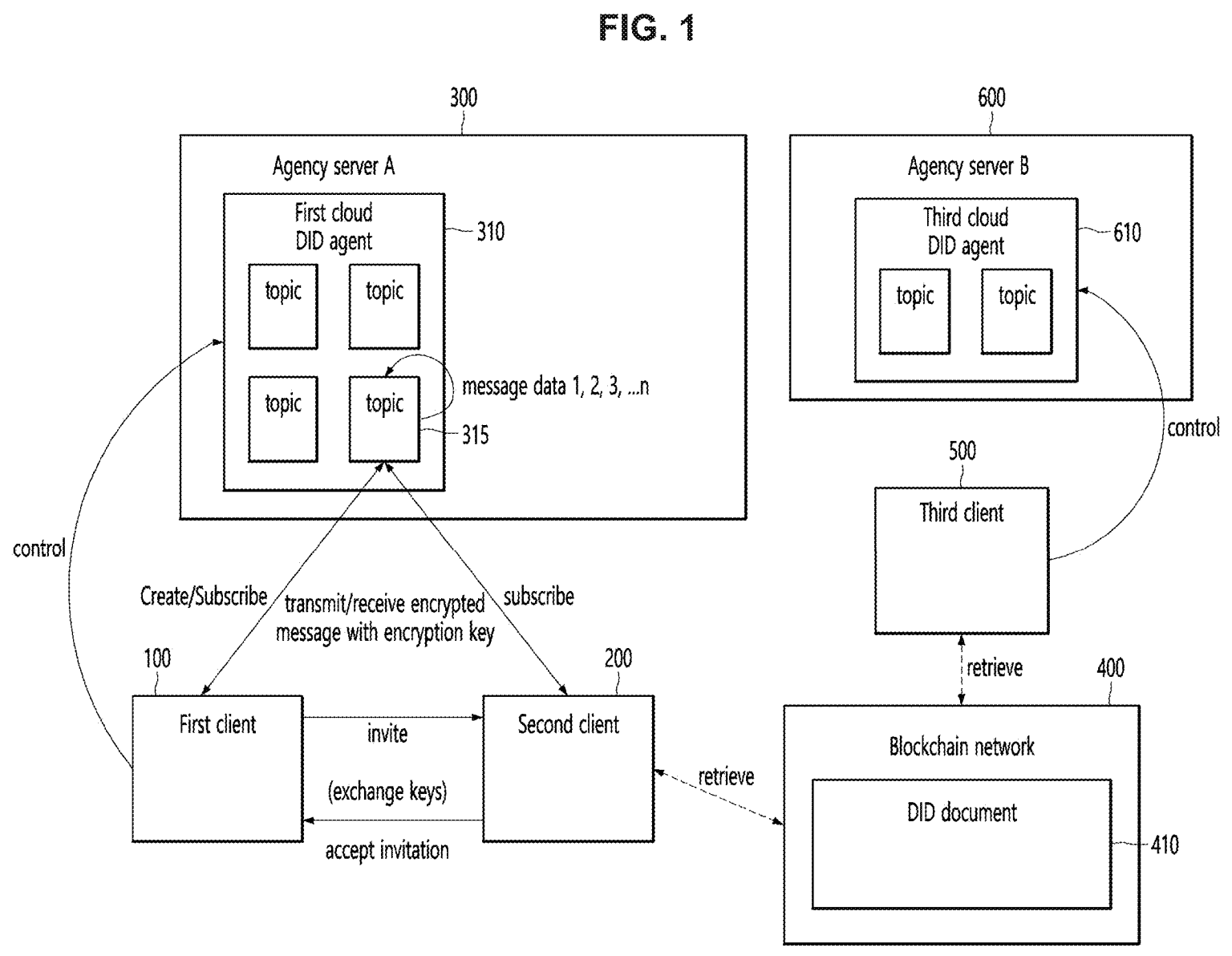

300
Agency server A
310
First cloud DID agent
topic
topic
topic
topic
315
message data 1, 2, 3, ...n
600
Agency server B
610
Third cloud DID agent
topic
topic
control
500
Third client
retrieve
400
Blockchain network
410
DID document
retrieve
subscribe
transmit/receive encrypted message with encryption key
Create/Subscribe
200
Second client
invite
(exchange keys)
accept invitation
100
First client
control

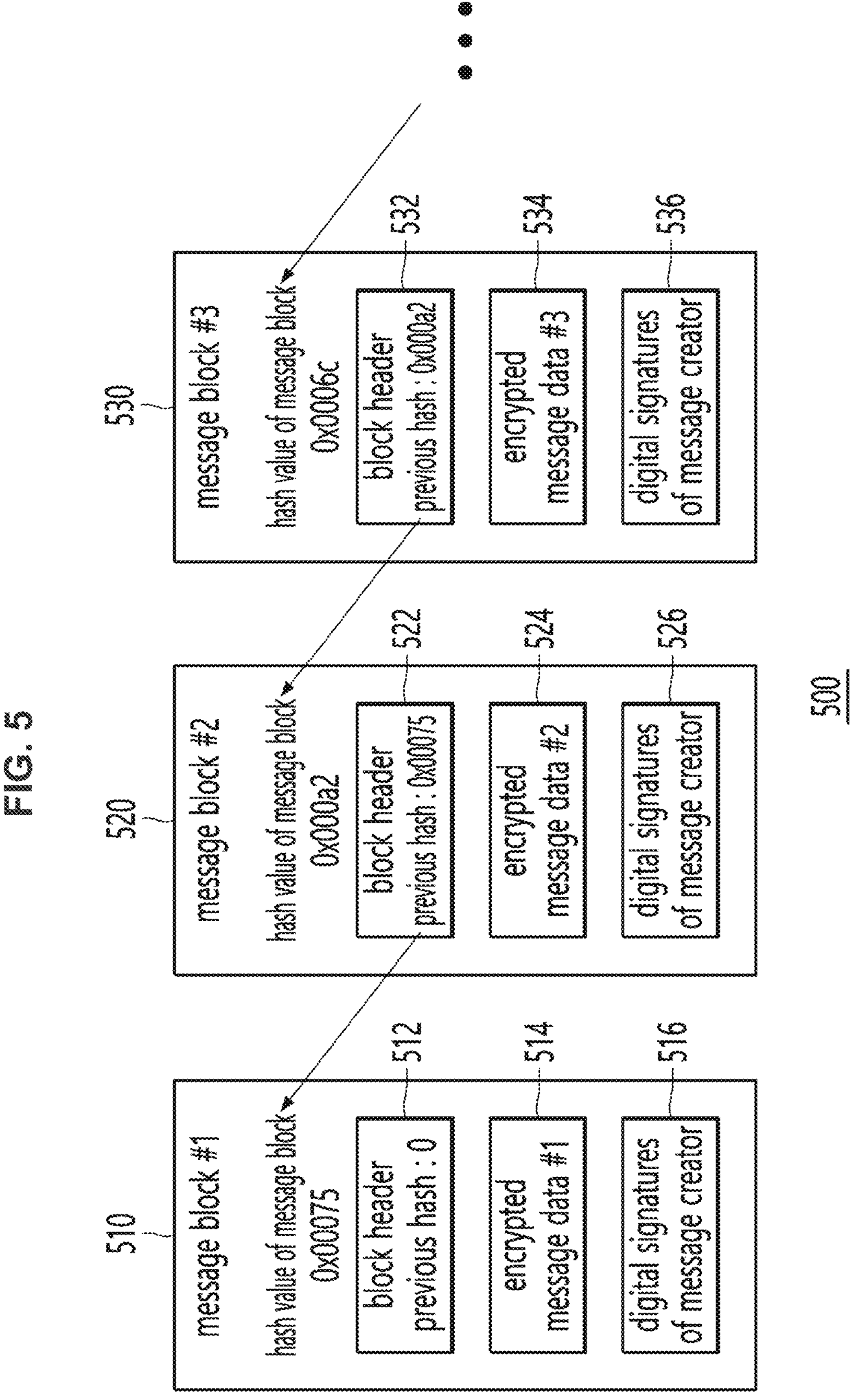
FIG. 5
510
message block #1
hash value of message block
0x0075
512
block header
previous hash : 0
514
encrypted
message data #1
516
digital signatures
of message creator
520
message block #2
hash value of message block
0x00a2
522
block header
previous hash : 0x0075
524
encrypted
message data #2
526
digital signatures
of message creator
530
message block #3
hash value of message block
0x006c
532
block header
previous hash : 0x00a2
534
encrypted
message data #3
536
digital signatures
of message creator
500

ELECTRONIC DEVICE AND METHOD FOR PROVIDING SECRET MESSENGER FUNCTION THROUGH END-TO-END ENCRYPTION ON BASIS OF BLOCKCHAIN DID TECHNOLOGY

CROSS-REFERENCE TO RELATED APPLICATIONS

This application is the U.S. National Stage of International Application No. PCT/KR2022/015505 filed Oct. 13, 2022, which claims benefit of priority to Korean Patent Application No. 10-2022-0108948 filed Aug. 30, 2022, the entire content of which is incorporated herein by reference.

TECHNICAL FIELD

The embodiments disclosed in this document relate to encryption technology and online chat applications.

BACKGROUND ART

Most commonly used messenger services typically transmit and receive messages between clients through a centralized server. When a central server acts as an intermediary for message transmission and reception, although prohibited by policy and law, the intermediary technically has the authority to store and access clients' private messages. Therefore, the intermediary can collect and utilize various data, and furthermore, has the potential to commercialize it. Consequently, there is a possibility of clients' private information being compromised.

DISCLOSURE OF THE INVENTION

Technical Problem

Since messenger services have the function of transmitting users' private message data, the message data must be encrypted. In messenger services provided until now, message data is encrypted and transmitted/received by the central server. To transmit and receive messages between clients without an intermediary such as a central server, encryption functionality between clients is necessary.

Additionally, message data is stored on the central server, and users who created the message data can only view the stored message data but do not have deletion/modification rights. Therefore, there is a problem where data creators' private rights over their own data are infringed.

Various embodiments disclosed in this document intend to implement scalable messenger functionality that is not dependent on a specific central server based on Decentralized Identifiers (DID) that can be retrieved through a public blockchain network. Furthermore, various embodiments disclosed in this document intend to provide an electronic device and method that provides messenger functionality where messages can be transmitted/received between clients without an intermediary through end-to-end encryption, and users can be guaranteed private rights over their message data.

Technical Solution

A client device according to one embodiment disclosed in this document may comprises a communication interface configured to communicate with an agency server and a counterpart device, a memory and at least one processor operably connected to the memory and configured to execute instructions, wherein the at least one processor is configured to: transmit a topic creation request to the agency server, when a topic creation notification is received from the agency server, generate a first subscription DID corresponding to the topic, a pair of first subscription private key and first subscription public key corresponding to the first subscription DID, transmit the first subscription DID to the counterpart device, receive a second subscription DID generated by the counterpart device from the agency server, generate a first encryption key based on the first subscription private key and the second subscription DID, and transmit message data encrypted with the first encryption key to the agency server.

Additionally, a method according to one embodiment disclosed in this document may comprises transmitting, by a first client, a topic creation request to an agency server, creating, by the agency server, a topic in a memory of the agency server in response to the topic creation request, generating, by the first client, a first subscription DID corresponding to the topic and a pair of first subscription private key and first subscription public key corresponding to the first subscription DID, and transmitting the first subscription DID to a second client, generating, by the second client, a second subscription DID corresponding to the topic and a pair of second subscription private key and second subscription public key corresponding to the second subscription DID, and transmitting the second subscription DID to the agency server, transmitting, by the agency server, the second subscription DID to the first client, transmitting, by the first client, message data encrypted with a first encryption key generated based on the first subscription private key and the second subscription DID to the agency server, transmitting, by the agency server, the encrypted message data to the second client and decrypting, by the second client, the encrypted message data with a first encryption key generated based on the second subscription private key and the first subscription DID.

Advantageous Effects

According to the embodiments disclosed in this document, end-to-end encrypted secret messenger functionality can be provided where the intermediary of the messenger function cannot decrypt the message data transmitted and received between endpoints.

Additionally, it can guarantee that the message sequence transmitted and received between clients has been delivered the Same to all clients.

In addition, various effects may be provided that are directly or indirectly identified through the present disclosure.

BRIEF DESCRIPTION OF THE DRAWINGS

FIG. 1 is a diagram for explaining an environment in which secret messenger functionality operates according to an embodiment.

FIG. 5 is a diagram for explaining the storage format of message sequences according to an embodiment.

With respect to the description of the drawings, the same or similar reference signs may be used for the same or similar elements.

MODE FOR CARRYING OUT THE INVENTION

Figure 2:
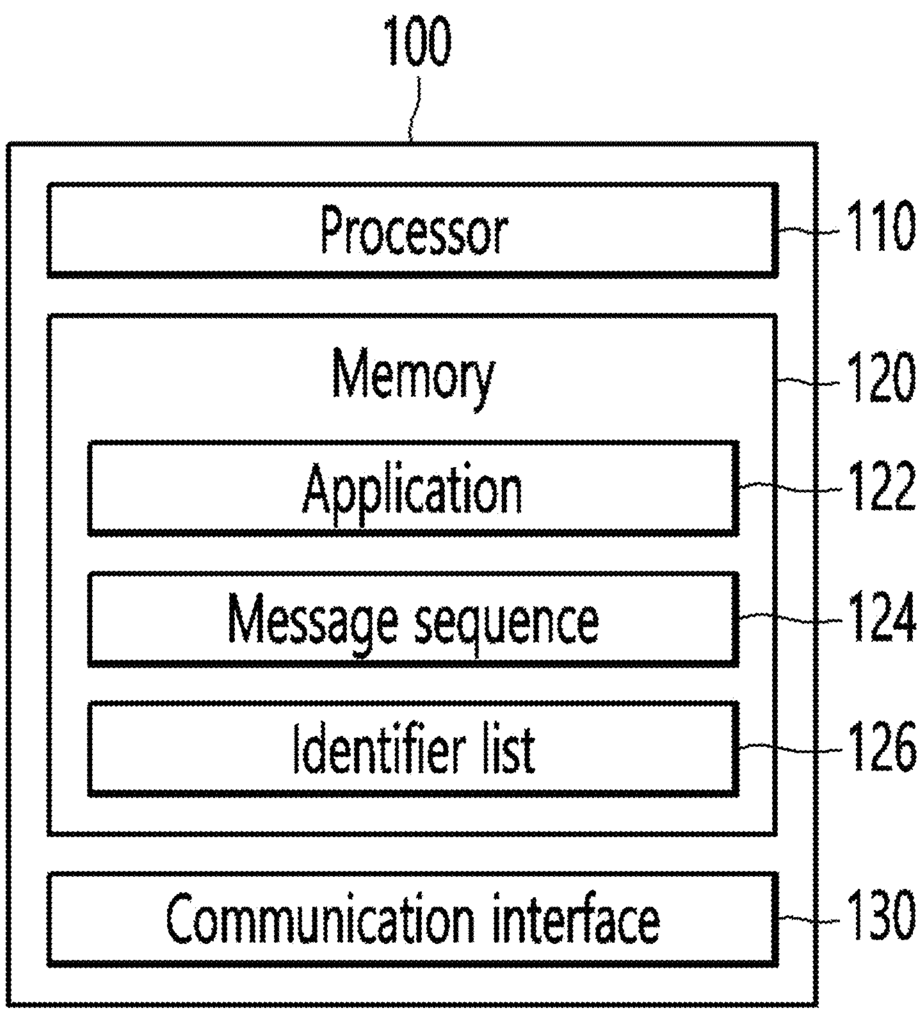
FIG. 2 is a block diagram of a client device according to an embodiment.

Hereinafter, various embodiments of the present disclosure will be described with reference to the accompanying drawings. However, this is not intended to limit the present disclosure to specific embodiments, and should be understood to include various modifications, equivalents, and/or alternatives of the embodiment of the present disclosure.

FIG. 1 is a diagram for explaining an environment in which secret messenger functionality (hereinafter, messenger functionality) operates according to an embodiment. The messenger functionality may be performed between a first client 100 and a second client 200. The first client 100 is assumed to be the inviter and creator of the topic, and the second client 200 is assumed to be the invitee of the topic. However, the second client 200 may also become the inviter and creator of the topic.

Agency server A 300 may be understood as a server device operated by an entity (e.g., a company) that provides messenger service capable of running the messenger functionality. Agency server A 300 may create a first cloud DID agent 310 that can be controlled by the first client 100 in at least one memory. The at least one memory may be understood as cloud storage space. The first client 100 may connect to and control the first cloud DID agent 310 in an internet environment.

The first cloud DID agent 310 may be understood as a module that can be controlled only by the first client 100. The first cloud DID agent 310 may correspond to the account DID of the first client 100, and the address (e.g., service endpoint) of the first cloud DID agent 310 may be stored in the DID document 410 on the blockchain network 400 in correspondence with the account DID.

In various embodiments, the blockchain network 400 may include at least one blockchain network among known public blockchains.

In one embodiment, an account DID may be understood as a user ID required to use the messenger functionality. The DID document 410 of the blockchain network 400 may store information associated with the account DID. Agency server A 300 and the second client 200 may retrieve the DID document (410) based on the account DID and retrieve information associated with the first client 100.

The first client 100 may create an account DID to be used as a user ID. The account DID may be understood as an ID that can be used as an account on the blockchain network 400. The first client 100 may generate a pair of private key/public key (hereinafter, account private key/account public key) corresponding to the account DID. The account public key may be stored in the blockchain network 400 mapped to the account DID. The account private key may be used to generate digital signatures of the first client 100 to be used in the messenger service. In various embodiments, the account DID and account public key may be same.

Agency server A 300 and the second client 200 may retrieve the DID document 410 based on the account DID and retrieve information associated with the first client 100.

The first cloud DID agent 310 may receive a topic creation request from the first client 100. When the topic creation request is received, the first cloud DID agent 310 may create a topic 315 within the first cloud DID agent (310).

A topic 315 may be understood as a messenger space created for the first client 100 within the first cloud DID agent 310 in the cloud space of agency server A 300. The first client 100 may invite other clients with whom they wish to use the messenger functionality to the topic 315. For example, an example is shown where the first client 100 has invited the second client 200 as a counterpart for exchanging messages through the messenger functionality on the topic 315.

When the topic 315 is created, the first client 100 may create a subscription DID corresponding to the topic 315. The subscription DID may be understood as an ID that can be used as an account on the blockchain network 400. The first client 100 may generate a pair of private key/public key (hereinafter, subscription private key/subscription public key) corresponding to the subscription DID. The first client 100 may exchange the subscription DID with other clients. The subscription DID may be understood as a key exchanged to generate an encryption key necessary for encrypting message data. In various embodiments, the subscription DID and subscription public key may be same.

The first client 100 may transmit a subscription request for the topic 315 to the agency server 300. When subscribed, agency server A 300 may transmit push notifications to the first client 100 regarding events (new message reception, topic deletion, new subscription request, etc.) that occur in relation to the topic 315. Through subscription, the first client 100 may receive notifications about events occurring in the topic 315 even when not online in the messenger service.

When topic 315 creation is completed, the first client 100 may invite the second client 200 to the topic 315. The first client 100 may transmit an invitation request to the second client 200, and the invitation request may include the subscription DID and account DID of the first client 100.

The second client 200 may retrieve the DID document 410 based on the account DID and obtain the address (e.g., service endpoint) of the first cloud DID agent 310 stored in matching with the account DID (DID resolution). The second client 200 may request a subscription for the topic 315 based on the address.

The second client 200 may generate a subscription DID, a pair of subscription public key and subscription private key corresponding to the subscription DID to use the messenger functionality in the topic 315, and may transmit the subscription DID to the first client 100. The first client 100 and the second client 200 can generate the same encryption key based on the exchanged subscription DIDs, and transmit and receive message data encrypted based on this encryption key. The sequence of message data (hereinafter, message sequence) transmitted and received between the first client 100 and the second client 200 may be stored in the topic 315, first client 100, and second client 200.

In various embodiments, the messenger functionality may be provided by different agency servers (agency server A 300 and agency server B 600). Since the messenger functionality operates based on account DIDs and subscription DIDs that can be retrieved through the public blockchain network 400, any server or client device that can connect to the blockchain network 400 through the network can provide or use the messenger functionality. Therefore, the architecture for operating the messenger functionality according to embodiments of the present invention has scalability. For example, agency server A 300 and agency server B 600 may be operated by different entities (e.g., companies). Thus, multiple different entities can implement the device and method according to embodiments of the present invention to provide messenger functionality and allow users to utilize it.

For example, the third client 500 may use the messenger functionality provided by agency server B 600. The third client 500 may request the creation of a third cloud DID agent 610 that can be controlled by the third client 500 from agency server B 600. The third client 500 can create topics, invite other clients, and use the messenger functionality through the third cloud DID agent 610 provided by agency server B 600.

FIG. 2 is a block diagram of a first client device 100 according to an embodiment. The description of the second client device 200 and third client device 500 is substituted with the description of the first client device 100. Also, hereinafter, the agency server 300 that can provide messenger service may be understood as agency server A 300 or agency server B 600. In the following embodiments, an agency server 300 operated by a single entity (e.g., company) provides the messenger service. However, other agency servers operated by different entities may provide the same messenger functionality.

The first client 100 according to various embodiments disclosed in this document may be various types of electronic devices. The first client 100 may include, for example, a portable communication device (e.g., smartphone), computer device, portable multimedia device, portable medical device, camera, wearable device, or home appliance. The electronic device according to embodiments of this document is not limited to the aforementioned devices.

In one embodiment, the first client 100 may include at least one processor 110, memory 120, and communication interface 130. The at least one processor 110 may control the overall operation of the first client 100. The processor 110 may be operably connected to the memory 120 and configured to execute instructions (e.g., application 122) stored in the memory 120. Hereinafter, operations performed by the first client 100 may be understood to be performed by the at least one processor 110.

The first client 100 may transmit and receive data with the agency server 300 and second client 200 through the communication interface 130.

The memory 120 may store the application 122. The first client 100 may initiate the messenger functionality by executing the application 122. The memory 120 may store the message sequence 124. The message sequence 124 may include message data generated through the messenger functionality. The message sequence 124 may store encrypted message data sequentially in the order generated, and as will be described later through FIG. 5, the encrypted message data may be included in message blocks, and multiple message blocks may be stored in blockchain form.

The memory 120 may store an identifier list 126. As the messenger functionality operates, the generated account DID, a pair of account private key and account public key corresponding to the account DID, subscription DID, and a pair of subscription private key and subscription public key corresponding to the subscription DID may be stored in the identifier list 126. In various embodiments, a plurality of subscription DIDS corresponding to a plurality of topics may be stored.

Figure 3:
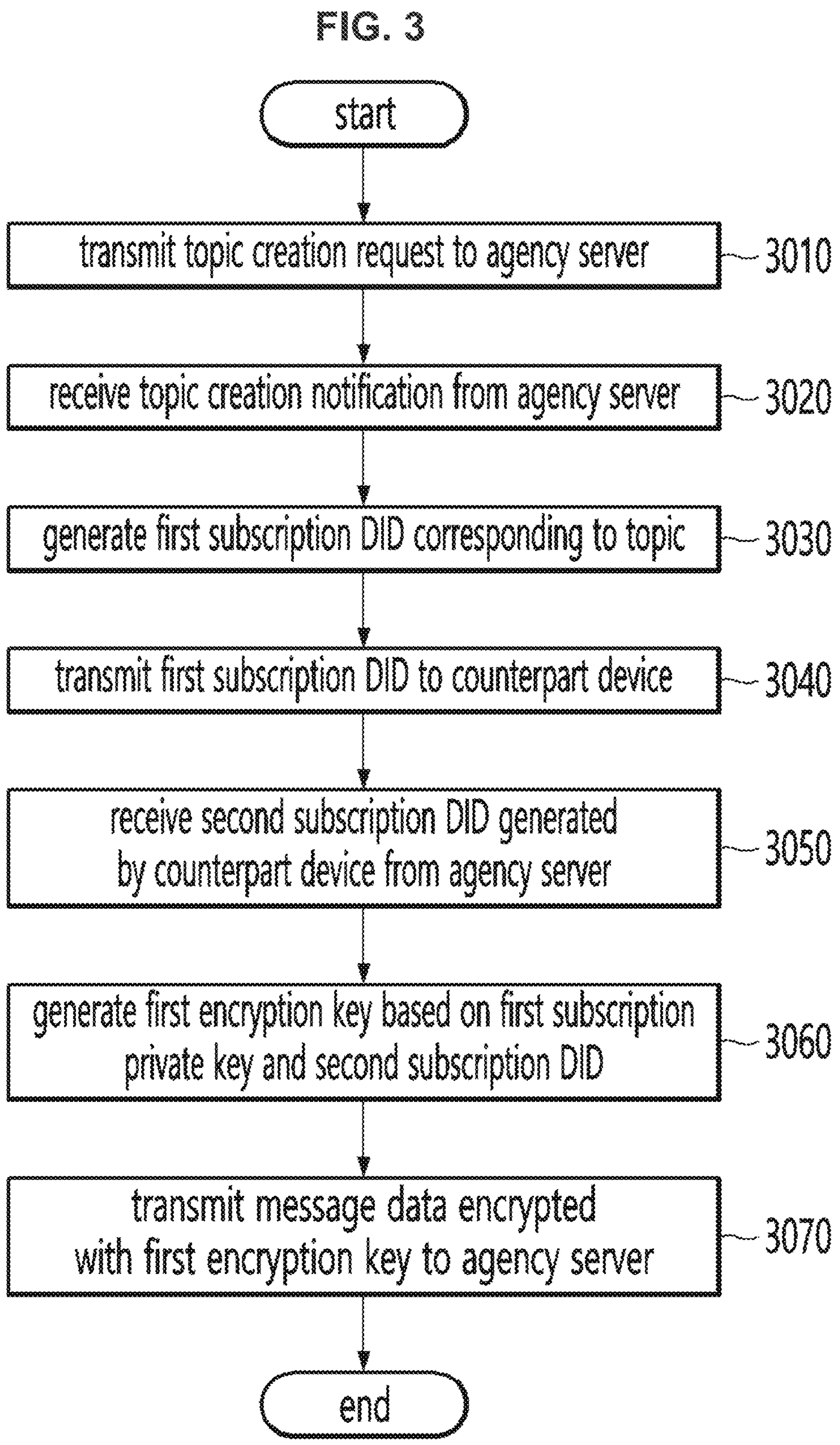
FIG. 3 is a flowchart of a method for providing secret messenger functionality by a client device according to an embodiment.

FIG. 3 is a flowchart of a method for providing secret messenger functionality by a client device according to an embodiment. The operations of FIG. 3 may be performed by the first client 100. In various embodiments, when the second client 200 becomes the inviter of the messenger, the second client 200 may perform the operations of the first client 100 described throughout the specification.

The first client 100 may transmit a topic creation request to the agency server 300 (3010). In response to the topic creation request, the agency server 300 may create a topic 315 within the first cloud DID agent 310 and generate a topic ID for the topic 315. The agency server 300 may transmit a topic creation notification to the first client 100.

The first client 100 may receive the topic creation notification from the agency server 300 (3020). The topic creation notification may include a topic ID. The first client 100 may access the topic 315 based on the address of the first cloud DID agent 310 and the topic ID.

In embodiments of the present invention, since the address of the first cloud DID agent 310 is stored in the DID document 410 corresponding to the first account DID, any third party (second client 200) who knows the first account DID can obtain the address of the first cloud DID agent 310 through DID resolution.

In embodiments of the present invention, the address of the created topic 315 is not stored in the DID document 410, and since the topic ID is shared only with the first client 100 and second client 200 participating in the topic 315, only clients participating in the topic can access the topic. This enhances the security of the topic.

The first client 100 may generate a first subscription DID corresponding to the topic 315 (or topic ID), a pair of first subscription private key and second subscription public key corresponding to the first subscription DID (3030). The first client 100 may transmit the first subscription DID to the second client 200 (e.g., second client 200 in FIG. 1) (3040).

The first client 100 may receive a second subscription DID generated by the second client 200 from the agency server 300 (3050).

The first client 100 may generate a first encryption key based on the first subscription private key and the second subscription DID (3060), and transmit message data encrypted with the first encryption key to the agency server 300 (3070). Specifically, the first client 100 may retrieve the DID document 410 based on the second subscription DID, obtain the second subscription public key, and then generate the first encryption key based on the first subscription private key and the obtained second subscription public key.

In various embodiments of operation 3070, the first client 100 may transmit the encrypted message data and a digital signature generated based on the first account private key to the agency server 300. The digital signature can indicate that the creator of the encrypted message data is the first client 100.

In various embodiments, the first client 100 may transmit a topic deletion request (a request to delete the message sequence stored in topic 315) including the digital signature generated based on the first account private key to the agency server 300. Upon receiving the deletion request, the agency server 300 may verify whether the digital signature is a valid signature generated by the legitimate first client 100 based on the first account public key stored in the DID document 410 of the blockchain network 400. The agency server 300 may perform the deletion of topic 315 according to the deletion request only after the verification of the digital signature is completed.

In operation 3010 according to various embodiments, the topic creation request may include the digital signature generated based on the first account private key. The agency server 300 may be configured to verify the digital signature and create the topic according to the topic creation request only when the verification is completed.

In various embodiments, control commands for the first cloud DID agent 310 (topic creation, deletion request) may be forced to include a digital signature based on the first account private key. Through this, only the first client 100 may have control authority over the first cloud DID agent 310.

Figure 4:
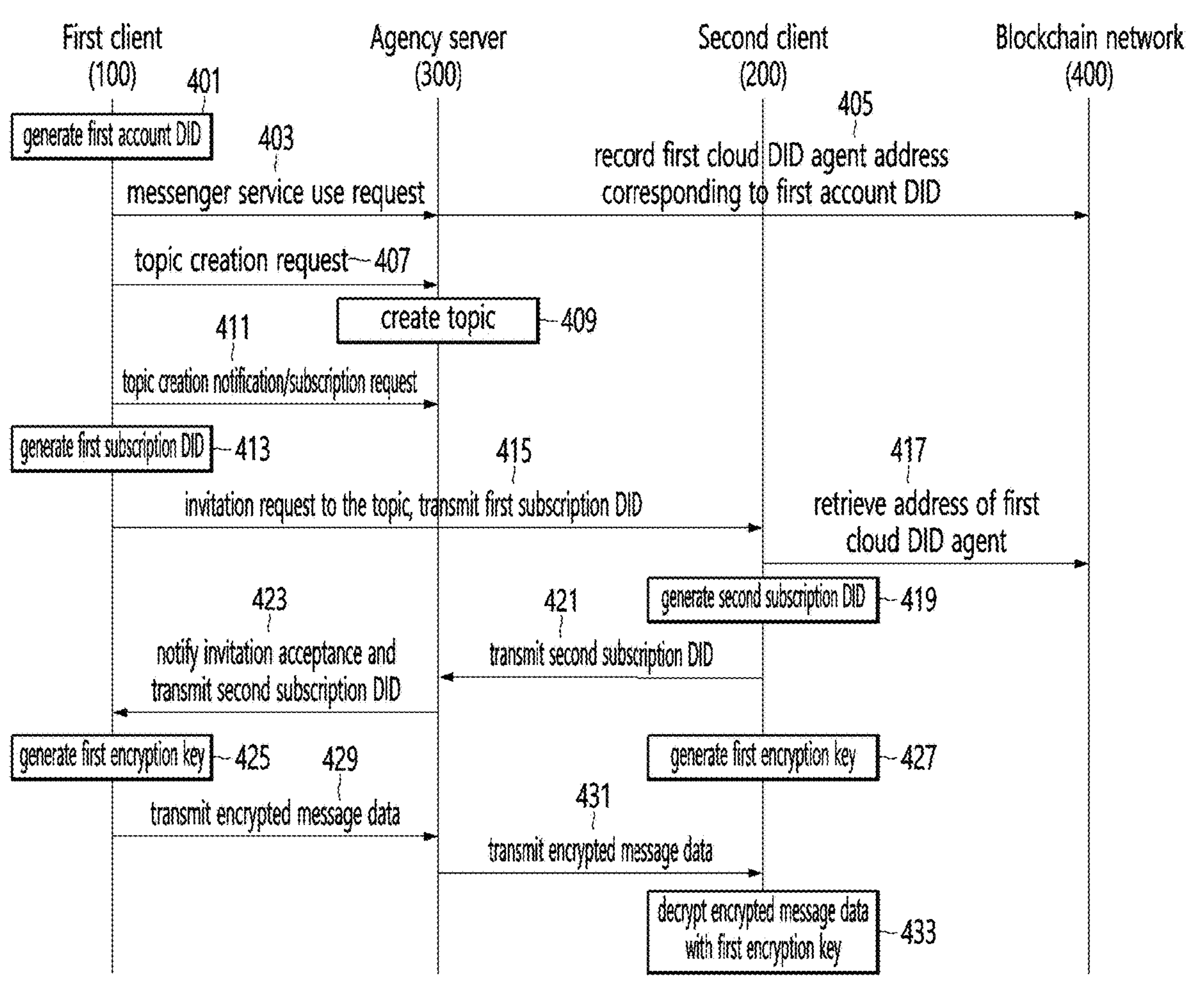
FIG. 4 is a signal flow diagram of a method for providing secret messenger functionality according to an embodiment.

FIG. 4 is a signal flow diagram of a method for providing secret messenger functionality according to an embodiment. The first client 100 may generate a first account DID for use in the messenger service, and a pair of account private key and account public key corresponding to the first account DID (401). The first account DID may be understood as the account ID of the first client 100 and the first client 100's user (hereinafter, first user) in the messenger service. The first account DID, account private key, and account public key may be stored in the first client 100 (e.g., identifier list 126). In various embodiments, the first account private key may be used when generating the first client 100's digital signature. In various embodiments, the account DID may be the same as the first account public key.

The first client 100 may transmit a messenger service use request to the agency server 300 (403). The messenger service use request is a request message necessary for the first user to use the messenger service through the agency server 300, and includes the first account did.

When the messenger service use request is transmitted, the agency server 300 may allocate a first cloud DID agent 310 corresponding to the first account DID (for the first user) and transmit the address of the first cloud DID agent 310 to the blockchain network 400 so that the allocated address is recorded in the blockchain network 400 corresponding to the first account DID (405). Through operations 401 to 405, the first client 100 gains authorization to use the messenger service provided by the agency server 300.

The first client 100 may create a topic in the first cloud DID agent 310, invite other users to the topic, and use the messenger service with other users. A plurality of topics may be created in the first cloud DID agent 310.

The first client 100 may transmit a topic creation request to the agency server 300 (407). In response to the topic creation request, the agency server 300 may create topic 315 (e.g., topic 315 in FIG. 1) in the memory (cloud space) of the agency server 300 (409).

When the topic 315 is created, the agency server 300 may transmit a topic creation notification to the first client 100, and the first client 100 may transmit a first subscription request for the topic to the agency server 300 (411).

The topic creation notification may include a topic ID assigned to the topic 315 created within the first cloud DID agent 310. For example, clients of the messenger service can access a specific topic of the first user based on the address of the first cloud DID agent 310 and the topic ID.

A subscription request may be understood as a request to receive notifications about events occurring in the topic 315 of the agency server 300. The agency server 300 may send push notifications to clients who have subscribed to a specific topic when events occur, such as receiving new messages or receiving new subscription requests.

In response to the first subscription request, the agency server 300 may transmit push notifications to the first client 100 about events occurring in the topic 315.

The first client 100 may generate a first subscription DID corresponding to the topic 315, a pair of first subscription private key and first subscription public key corresponding to the first subscription DID (413), and may transmit an invitation request to the topic to the second client 200, and the invitation request may include the first subscription DID (415).

In operation 415, the first subscription DID may be understood as a key exchanged to generate an encryption key for encrypting message data created between the first client 100 and the second client 200.

In various embodiments, the first client 100 may generate different subscription DIDs for each topic, and a pair of subscription private keys and subscription public keys corresponding to each of the subscription DIDs. The subscription DID may be used as a key exchanged to generate an encryption key for the topic.

When the second client 200 receives the invitation request, the second client 200 may retrieve the DID document 410 associated with the first client 100 and obtain the address of the topic 315 created by the first client 100 from the blockchain network 400. For example, in operation 415, the invitation request may further include the first account DID and topic ID of topic 315. The second client 200 may retrieve the address of the first cloud DID agent 310 stored in correspondence with the first account DID from the blockchain network 400 based on the first account DID (417). The second client 200 may access the topic 315 based on the address of the first cloud DID agent 310 and the topic ID.

In operation 415 according to various embodiments, the first client 100 may deliver the invitation request to the second client 200 through an SMS message via a carrier's communication network. Alternatively, the first client 100 may generate the invitation request as a QR code, and the second client 200 may receive the invitation request by scanning the QR code. Or without communication between the first client 100 and second client 200, the first user of the first client 100 may deliver the invitation request by providing the first subscription DID, first account DID, and topic ID to the second user of the second client 200 offline.

In response to the invitation request to the topic 315, the second client 200 may generate a second subscription DID corresponding to the topic 315, a pair of second subscription private key and second subscription public key corresponding to the second subscription DID (419). The second client 200 may transmit the second subscription DID to the agency server 300. The second subscription DID may be understood as a key exchanged to generate an encryption key for encrypting message data created between the first client 100 and the second client 200.

In various embodiments, for different topics, the second client 200 may generate a subscription DID corresponding to a specific topic and a pair of subscription private key and subscription public key corresponding to the subscription DID. The subscription DID may be used for key exchange to generate an encryption key for the specific topic.

The second client 200 may transmit the second subscription DID to the agency server 300 (421). For example, the second client 200 may transmit an invitation acceptance message to the agency server 300. The invitation acceptance message may include the second subscription DID.

In various embodiments, the invitation acceptance message may include a second subscription request for the topic 315. The second client 200 may transmit a second subscription request including the address of the topic 315 (first cloud DID agent 310 address, topic ID) to the agency server 300. The agency server 300 may transmit push notifications about events occurring in the topic 315 to the second client 200 in response to the second subscription request.

The agency server 300 may transmit the second subscription DID to the first client 100 (423). The agency server 300 may transmit an invitation acceptance notification from the second client 200 to the first client 100. For example, the invitation acceptance notification may include the second subscription DID.

The first client 100 and second client 200 may perform Diffie-Hellman key exchange to generate an encryption key for use in a symmetric key algorithm. By exchanging the first subscription DID and second subscription DID, the first client 100 and second client 200 exchange each other's public keys (first subscription public key, second subscription public key). The first client 100 and second client 200 can generate an encryption key by exchanging public keys with each other.

The first client 100 may generate a first encryption key based on the first subscription private key and the second subscription DID received from the second client 200 (425). The first client 100 may retrieve the DID document 410 based on the second subscription DID and obtain the second subscription public key from it (DID resolution). The first client 100 may generate the first encryption key based on the first subscription private key and second subscription public key.

The second client 200 may generate the first encryption key based on the second subscription private key and the first subscription DID received from the first client 100 (427). The second client 200 may retrieve the DID document 410 based on the first subscription DID and obtain the first subscription public key from it (DID resolution). The second client 200 may generate the first encryption key based on the second subscription private key and first subscription public key.

The first client 100 may transmit message data encrypted with the first encryption key to the agency server 300 (429). The agency server 300 may transmit the encrypted message data to the second client 200 (431), and the second client 200 may decrypt the encrypted message data with the first encryption key (433).

In operation 429, the agency server 300 may store the encrypted message in the topic 315. In operation 433, the second client 200 may display the decrypted message through a display (not shown) and store the decrypted message in the second client 200's memory (e.g., memory 120 in FIG. 2). Since the first encryption key can only be generated by the first client 100 and second client 200, and the agency server 300 cannot know the first encryption key, encrypted messages stored on the agency server 300 cannot be decrypted by the agency server 300 or other third parties. This enables end-to-end encrypted secret messenger functionality.

In various embodiments, the first client 100, as the creator of topic 315, may have deletion authority over topic 315. For example, when the first client 100 transmits a deletion request for topic 315 including the first client 100's digital signature (generated by the first account private key) to the agency server 300, the agency server 300 may verify the digital signature in response to the deletion request and then delete topic 315 and the message sequence included in topic 315 stored on the agency server 300.

FIG. 5 is a diagram for explaining the storage format of message sequences according to an embodiment. In various embodiments, the message sequence 500 stored on the agency server 300 may be stored in blockchain form as illustrated in FIG. 5.

Message blocks (510, 520, 530) may include hash values of previous message blocks (512, 522, 532), encrypted message data (514, 524, 534), and digital signatures of message creators (516, 526, 536).

The hash values of message blocks (512, 522, 532) may be understood as hash values computed for message blocks through a predetermined hash function. When there is no previous message block, i.e., for the first message block being created, the previous hash value may be set to 0.

The encrypted message data (514, 524, 534) may be understood as message data encrypted by the first encryption key in FIG. 3 and FIG. 4.

The digital signatures of message creators (516, 526, 536) may be understood as digital signatures generated based on the first client 100's first account private key or digital signatures generated based on the second client 200's second account private key. The receiving client can verify who the message creator is through these digital signatures (516, 526, 536).

In various embodiments, the second client 200, as an invitee, may generate a second account DID for using the messenger service, and a pair of second account private key and second account public key corresponding to the second account DID. The second account public key may be recorded in the DID document 410 mapped to the second account DID, and digital signatures generated based on the second account private key can be verified through the second account public key.

Referring to FIG. 3 and FIG. 4, Through the process of the second client 200 receiving a message created by the first client 100, the creation and utilization of the message sequence 500 will be described. For example, the process of the first client 100 creating message block 2 (520) and transmitting it to the second client 200 will be described.

In operation 3070 of FIG. 3, the first client 100 may create message block 520 including the encrypted message data 524 and a block header 522 containing the hash value (0x00075) of the previous message block, and may transmit the created message block 520 to the agency server 300. The agency server 300 may transmit this message block to the second client 200. Message block 520 may further include a digital signature 526 generated based on the first client 100's first account private key.

In one embodiment, the second client 200 may determine whether the hash value (0x00075) of the previous message block stored in message block 520 is identical to the hash value (0x00075) of the previous message block 1 (510) already stored in the second client 200.

The first client 100 and second client 200 can prove that they have exactly the same message sequence containing all message data they have exchanged by confirming that they have message blocks with the same last hash value. Since existing messenger intermediary services are best-effort systems that do not guarantee 100% message delivery, this blockchain structure according to an embodiment of the present invention can guarantee the immutability and integrity of the message sequence.

If the hash value (0x00075) of the previous message block stored in message block 2 (520) is not identical to the hash value of the previous message block 510 already stored in the second client 200, the second client 200 may transmit a hash value mismatch alarm to the first client 100 through the agency server 300.

In various embodiments, a hash value mismatch alarm may occur when some messages are missing due to the agency server 300, or when some messages are modified or missing due to attacks such as third-party hacking. This alarm means that the messaging channel between the first client 100 and second client 200 is not secure. In this case, the topic creator (first client 100) may delete the topic and create a new topic. Alternatively, the first client 100 may delete the first cloud DID agent 310 and create a request for a new cloud DID agent. The deletion of the existing cloud DID agent and the creation request for a new cloud DID agent may include a digital signature generated based on the first account private key and may be transmitted to the agency server 300.

In various embodiments, when two message blocks are received simultaneously from the first client 100 and second client 200, the agency server 300 may process only one of the two message blocks as received and reject the other message block. This is because received message blocks must be recorded sequentially in blockchain form. The agency server 300 may send a notification requesting message retransmission to the creator of the rejected message block.

In various embodiments, the first client 100 may additionally invite a third client (e.g., third client 500 in FIG. 1) to use the messenger functionality in topic 315. In this case, the first client 100 may transmit the first encryption key, generated through key exchange with the second client 200, to the third client. At this time, the first client 100 and the third client can generate a second encryption key through key exchange using the same method described above. The first client 100 may encrypt the first encryption key with the second encryption key and transmit the first encryption key encrypted with the second encryption key to the third client. For example, the first client 100 may transmit message data containing the first encryption key encrypted with the second encryption key to topic 315, allowing the third client to obtain the first encryption key by decrypting the message data. Alternatively, the first client 100 may transmit the first encryption key encrypted with the second encryption key to the third client through a separate communication method between the first client 100 and the third client. Once the third client receives the first encryption key, the third client can encrypt message data with the first encryption key and transmit it to topic 315, or decrypt message data transmitted to topic 315.

Various embodiments of this document and terms used therein are not intended to limit the technical features described in this document to specific embodiments, and should be understood to include various modifications, equivalents, or alternatives of the embodiments. In relation to the description of the drawings, similar reference numerals may be used for similar or related components. The singular form of a noun corresponding to an item may include one item or a plurality of items, unless the relevant context clearly dictates otherwise. In this document, each of phrases such as "A or B", "at least one of A and B", "at least one of A or B", "A, B or C", "at least one of A, B and C", and "at least one of A, B, or C" may include all possible combinations of items listed together in the corresponding phrase among those phrases. Terms such as "first", "second", "firstly", or "secondly" may simply be used to distinguish a corresponding component from other corresponding components, and do not limit the corresponding components in other respects (e.g., importance or order). In this document, if a certain (e.g., first) element is referred to as being "connected" or "coupled" with or without the terms "functionally" or "communicatively" to another (e.g., second) component, it means that the certain component can be connected to the other component directly (e.g., in a wired manner), wirelessly, or through a third component.

Various embodiments as set forth herein may be implemented as software including one or more instructions that are stored in a storage medium (e.g., the memory 120) that is readable by a machine (e.g., the first client 100, the second client 200). For example, a processor (e.g., the processor 110) of the machine (e.g., the first client 100, the second client 200) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed in this document may be provided by being included in a computer program product. The computer program product may be traded between a seller and a buyer as a commodity. The computer program product may be distributed in the form of a machine-readable storage medium (e.g., compact disc read only memory (CD-ROM)), or may be distributed (e.g., downloaded or uploaded) online, through an application store (e.g., Play Store™) or directly between two user devices (e.g., smartphones). In the case of online distribution, at least part of the computer program product may be temporarily stored or tentatively generated in the machine-readable storage medium such as a memory of a manufacturer's server, application store server, or relay server.

According to various embodiments, each component (e.g., module or program) of the components described above may include one or a plurality of entities. According to various embodiments, one or more components among the components described above or operations may be omitted, or one or more other components or operations may be added. Alternatively or additionally, a plurality of components (e.g., modules or programs) may be integrated into one component. In this case, the integrated component may perform one or more functions of each component of the plurality of components identically or similarly to those functions performed by a corresponding component among the plurality of components prior to the integration. According to various embodiments, operations performed by modules, programs, or other components may be executed sequentially, in parallel, iteratively, or heuristically, or one or more of the operations may be executed in a different order or omitted, or, one or more other operations may be added.

The invention claimed is:

1. A client device comprising:

a communication interface configured to communicate with an agency server and a counterpart device;

a memory; and at least one processor operably connected to the memory and configured to execute instructions;

wherein the at least one processor is configured to:

transmit a topic creation request to the agency server, when a topic creation notification is received from the agency server, generate a first subscription Decentralized Identifiers (DID) corresponding to the topic, a pair of first subscription private key and first subscription public key corresponding to the first subscription DID, transmit the first subscription DID to the counterpart device, receive a second subscription DID generated by the counterpart device from the agency server, generate a first encryption key based on the first subscription private key and the second subscription DID, and transmit message data encrypted with the first encryption key to the agency server.

2. The client device of claim 1, wherein the at least one processor is configured to:

generate a message block including the encrypted message data and a hash value of a previous message block, and transmit the message block to the agency server.

3. The client device of claim 1, wherein the at least one processor is configured to:

generate a first account DID corresponding to the client device, a pair of account private key and account public key corresponding to the first account DID, transmit the first account DID to the agency server, and receive an address of a cloud DID agent corresponding to the first account DID from the agency server, wherein the topic is included in the cloud DID agent.

4. The client device of claim 3, wherein the topic creation notification includes a topic ID which is generated by the agency server and corresponds to the topic, and wherein the at least one processor is configured to:

transmit the first account DID, the topic ID, and the first subscription DID to the counterpart device, and transmit the encrypted message data to the topic created in the cloud DID agent through the address of the cloud DID agent and the topic ID.

5. The client device of claim 4, wherein the address of the cloud DID agent is stored in a blockchain network corresponding to the first account DID.

6. The client device of claim 3, wherein the at least one processor is configured to:

obtain a second subscription public key stored in mapping with the second subscription DID from the blockchain network based on the second subscription DID, and generate the first encryption key based on the obtained second subscription public key and the first subscription private key.

7. A method for providing messenger service, comprising:

transmitting, by a first client, a topic creation request to an agency server;

creating, by the agency server, a topic in a memory of the agency server in response to the topic creation request;

generating, by the first client, a first subscription DID corresponding to the topic and a pair of first subscription private key and first subscription public key corresponding to the first subscription DID, and transmitting the first subscription DID to a second client;

generating, by the second client, a second subscription DID corresponding to the topic and a pair of second subscription private key and second subscription public key corresponding to the second subscription DID, and transmitting the second subscription DID to the agency server;

transmitting, by the agency server, the second subscription DID to the first client;

transmitting, by the first client, message data encrypted with a first encryption key generated based on the first subscription private key and the second subscription DID to the agency server;

transmitting, by the agency server, the encrypted message data to the second client; and decrypting, by the second client, the encrypted message data with the first encryption key generated based on the second subscription private key and the first subscription DID.

8. The method of claim 7, further comprising:

generating, by the first client, a first account DID corresponding to the first client and a pair of first account private key and first account public key corresponding to the first account DID;

transmitting, by the first client, the first account DID to the agency server;

generating, by the agency server, a cloud DID agent corresponding to the first account DID; and receiving, by the first client, a cloud DID agent address corresponding to the first account DID from the agency server;

wherein the creating of the topic by the agency server comprises: creating, by the agency server, the topic within the cloud DID agent in response to the topic creation request.

9. The method of claim 8, further comprising:

transmitting, by the first client, a deletion request for the topic including a digital signature based on the first account private key to the cloud DID agent;

verifying, by the agency server, the digital signature through a blockchain network;

deleting, by the agency server, the topic stored in the cloud DID agent in response to the deletion request when the digital signature is confirmed to be a valid digital signature generated by the first client.

10. The method of claim 7, further comprising:

storing, by the agency server, the encrypted message in the topic; and displaying, by the second client, the decrypted message through a display of the second client.

11. The method of claim 7, further comprising:

generating, by the first client, a message block including the encrypted message data and a hash value of a previous message block, and transmitting the message block to the agency server;

transmitting, by the agency server, the message block to the second client; and determining, by the second client, whether the hash value of the previous message block stored in the message block is identical to a hash value of a previous message block previously stored in the second client.

12. The method of claim 11, further comprising:

transmitting, by the second client, a hash value mismatch alarm to the first client through the agency server when the hash value of the previous message block stored in the message block is not identical to the hash value of the previous message block previously stored in the second client.

13. The method of claim 7, wherein generating the first encryption key by the first client using the first subscription private key and the second subscription DID comprises:

obtaining, by the first client, a second subscription public key stored in mapping with the second subscription DID from the blockchain network based on the second subscription DID; and generating, by the first client, the first encryption key based on the obtained second subscription public key and the first subscription private key.

* * * * *